A. TYSON.
WEED DESTROYER.
APPLICATION FILED JUNE 19, 1918.
1,299,406.
Patented Apr. 1, 1919.
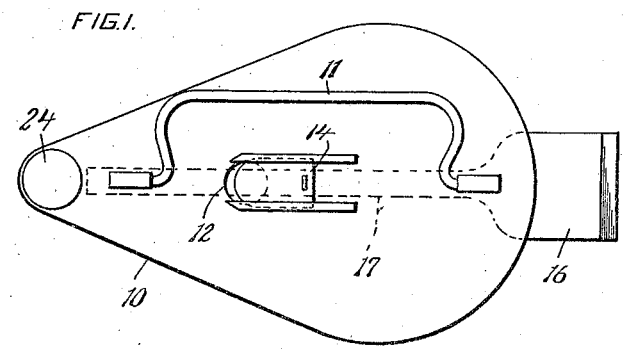
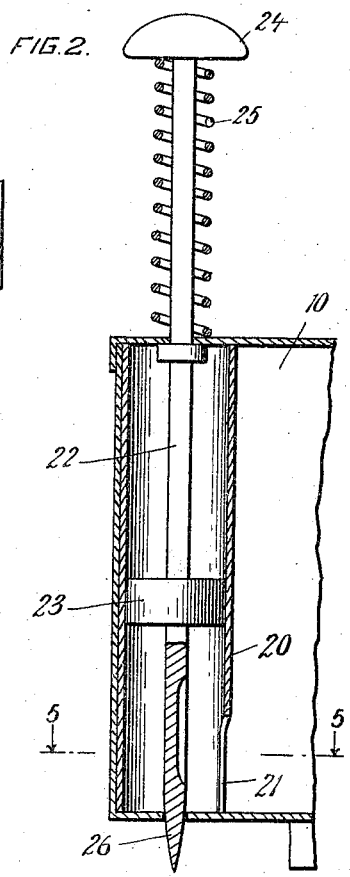
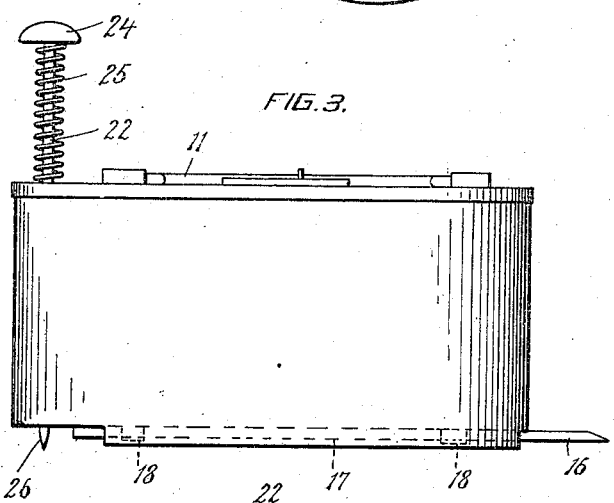
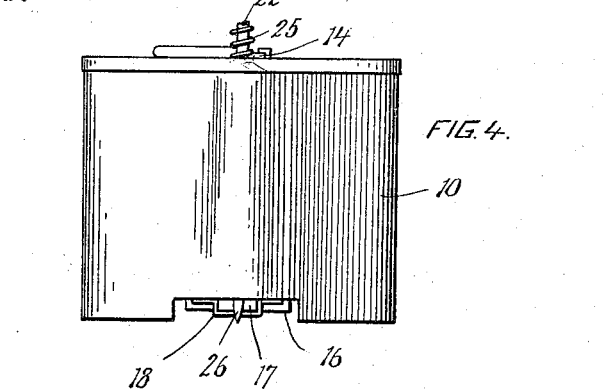
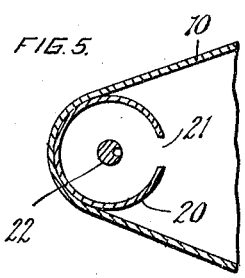
INVENTOR
Alfred Tyson
BY
William E. Richards
ATTORNEY

UNITED STATES PATENT OFFICE.

ALFRED TYSON, OF SAPPINGTON, MISSOURI.

WEED-DESTROYER.

1,299,406. Specification of Letters Patent. Patented Apr. 1, 1919.

Application filed June 19, 1918. Serial No. 240,857.

*To all whom it may concern:*

Be it known that I, ALFRED TYSON, a citizen of the United States, residing at Sappington, county of St. Louis, State of Missouri, have invented a new and useful Improvement in Weed-Destroyers, of which the following is a specification.

This invention relates to improvements in weed eradicators, and has as its object the provision of a manually operable apparatus whereby plants of an objectionable nature may be destroyed in an expeditious and convenient manner and without uprooting the same or disturbing the surface of the soil in which they are growing.

A further object is to combine in the apparatus, mechanical means for shearing or trimming the leaves, preparatory to perforating the root; also means for applying a chemical substance of a nature adapted to kill and destroy plant life, to the punctured root; effectually preventing its sprouting or the further growth of the same.

Finally to provide an apparatus by means of which gardens, walks, lawns and the like may be kept free from noxious or objectionable plants, such as dandelions, thistles, burdocks, plantains, etc., without disfigurement of the surface or the hard manual labor usually required. These and like objects are attained by the novel construction and combination of parts hereinafter described and shown in the accompanying drawing, forming a material part of this disclosure, and in which:—

Figure 1 is a plan view of a weed destroyer made in accordance with the invention;

Fig. 2 is a fragmental vertical sectional view taken through the front part of the apparatus;

Fig. 3 is a side elevational view of the same;

Fig. 4 is a front end view of the apparatus showing the trimming blade and method of attachment; and Fig. 5 is a fragmental sectional view taken on the line 5—5 of Fig. 2.

In the drawing, the numeral 10 denotes a hollow container having an operating handle 11, and a filling opening 12 in its top, normally closed by a cover 14.

A chisel shaped blade 16 formed with a reduced shank 17, is engaged to the bottom of the container by means of clips 18, the cutting edge extending out beyond the rear in such manner that it can be used in trimming away the leaves of the plant by manipulating the handle in an obvious manner.

Secured in the narrow front of the container is a vertical tube 20, having a passage 21, through its wall, communicating with the interior so that liquids may pass.

A plunger rod 22 operates centrally in the tube, being guided by a thick pliable washer 23 which is fitted therein and secured to the rod, the latter extending through the top of the container and being provided with an operating knob 24, between which and the container is disposed a coiled expansion spring 25 encircling the rod and holding it normally in a raised position.

The lower end of the plunger rod 22, below the washer, is formed into a needle 26, passing through the bottom of the container and can be extended to some distance below by depressing the knob 24 sufficiently to cause the open longitudinal recess 28, filled with the liquid, to enter well within the root of the plant.

In operation, the tank or container 10 having been filled with a fluid destructive to plant life, such as a solution of quicklime, sulfuric or other acid, kerosene or the like, the implement is grasped by the handle and used in the manner of a mattock, clipping away the leaves of the plant and exposing the crown or heart, immediately above the root.

The needle 26 is then appiled to the center of the root and the plunger rod raised and lowered, causing the needle to puncture the root repeatedly, while a small quantity of the destructive liquid is forced into the root effectually destroying all life usually by a single application.

Having thus described my invention, what I claim as new and desire to secure by Letters Patent, is:—

A weed destroyer comprising a liquid receptacle having opposite sides converging toward one another at an acute angle and merging into one another in an arcuately curved wall, a cylinder extending vertically within the receptacle at the point of junction of the said converging sides and fitting closely against the said arcuately curved wall and having its bottom end co-incident with the bottom of the receptacle, said cylinder having an opening in the inwardly facing portion of its side wall adjacent to the bottom thereof leading into the receptacle, a plunger is said cylinder, an operating handle for said plunger, resilient means holding said plunger above the said opening in the cylinder, a needle extending downwardly from the plunger through the bottom of the receptacle, said needle having a longitudinal groove in its side normally positioned entirely above the bottom of the receptacle and adapted to be entered into the weed to be eradicated when the plunger is depressed.

In testimony whereof, I have signed my name to this specification this 22nd day of December, 1917.

ALFRED TYSON.

Copies of this patent may be obtained for five cents each, by addressing the "Commissioner of Patents, Washington, D. C."